United States Patent [19]
Fisher et al.

[11] Patent Number: 5,828,747
[45] Date of Patent: Oct. 27, 1998

[54] CALL DISTRIBUTION BASED ON AGENT OCCUPANCY

[75] Inventors: Thomas S. Fisher, Westminster; Andrew D. Flockhart, Thornton; Roy A. Jensen, Westminster; Joylee E. Kohler, Northglenn, all of Colo.; Eugene P. Mathews, Barrington, Ill.; Edward L. Smelko, Boulder, Colo.

[73] Assignee: Lucent Technologies Inc., Murray Hill, N.J.

[21] Appl. No.: 790,143

[22] Filed: Jan. 28, 1997

[51] Int. Cl.$^6$ ...................................................... H04M 5/06
[52] U.S. Cl. ........................... 379/309; 379/265; 379/266
[58] Field of Search ..................................... 379/265, 266, 379/309, 201, 210, 211, 212, 214

[56] References Cited

U.S. PATENT DOCUMENTS

| | | | |
|---|---|---|---|
| 4,694,483 | 9/1987 | Cheung | 379/265 |
| 4,763,353 | 8/1988 | Canale et al. | 379/265 |
| 5,206,903 | 4/1993 | Kohler et al. | 379/309 |
| 5,299,260 | 3/1994 | Shaio | 379/265 |
| 5,509,055 | 4/1996 | Ehrlich et al. | 379/309 |

*Primary Examiner*—Ahmad F. Matar
*Attorney, Agent, or Firm*—David Volejnicek

[57] ABSTRACT

A call-distribution function (150) of an ACD system (101) improves the equity of distribution of calls to agents (106–108) by basing the distribution on the agents' individual occupancies. Illustratively, determining an agent's occupancy involves either determining (304) how many calls the agent has handled within a predetermined time interval, or determining (305) how much time of a predetermined time interval the agent has spent on handling of calls. The occupancy is periodically re-determined, and a next call is allocated to the presently least-occupied one of agents who are available to take the call, or to an agent to whose occupancy the allocation will be most beneficial, such as an available agent to whom allocation of the call will maximize convergence of actual and target occupancies. A queue (135) of agents available is ordered in the inverse order of the agent's occupancies, and a newly-available agent is slotted (inserted) (306) into the queue in a position (202) that ensures the continued inverse ordering of the agent queue. The occupancies of agents are then re-determined (308) and the agents are re-enqueued (310) accordingly.

32 Claims, 3 Drawing Sheets

CALL DISTRIBUTION BASED ON AGENT OCCUPANCY

TECHNICAL FIELD

This invention relates to automatic call distribution (ACD) systems, also variously referred to as call centers or telemarketing systems.

BACKGROUND OF THE INVENTION

ACD systems distribute calls—whether inbound or outbound—for handling to any suitable ones of available call-handling agents according to some predefined criteria. When there are not enough calls to keep all agents occupied, the idle agents are placed in an agent queue to await arrival of calls. The standard call-distribution algorithm that is used in most present-day ACD systems is the most-idle agent (MIA) algorithm. This algorithm adds an agent to the tail of the agent queue when the agent becomes idle. The agent at the head of the queue is therefore the agent who has been idle for the longest period of time. When a next call arrives, the call is routed to the agent at the head of the agent queue.

ACD systems that implement the agent-skills feature (described in U.S. Pat. No. 5,206,903, for example) often employ the expert-agent distribution (EAD) call-distribution algorithm. According to the agent-skills feature, agents have levels of expertise in various skills. An agent may have expertise in a plurality of skills, and may have a different level of expertise in each skill. Each skill has its own associated agent queue, and each agent queue is divided into a prioritized sequence of separate virtual queues, one for each skill level—the skill levels serve as priorities. The EAD algorithm adds an agent to the tail of the virtual queue that corresponds to the agent's skill level of each agent queue that corresponds to the agent's skills. When a next call arrives with an indication that it requires a particular skill for its handling, the call is routed to the agent at the head of the agent queue that corresponds to the particular skill, and the agent is deleted from all agent queues. The call is thus routed to the most-expert most-idle agent having the required expertise.

Through the use of these call-distribution algorithms, the ACD systems attempt to ensure that calls are distributed to the agents equitably. But equity may require that all agents spend the same amount of time handling calls. Or, equity may require that all agents should handle the same number of calls. Unfortunately, equity is often not achieved by these algorithms. For example, if an agent receives a call which takes significantly longer-than-normal to handle, neither the MIA nor the EAD algorithm corrects for this anomaly, but instead both algorithms rely entirely on chance in the hope that, over a long-enough period of time, each of the agents will receive the same number of abnormal calls and thus equalize the agents' loads. Furthermore, both the MIA and the EAD algorithm is likely to create "hot seats", occupied by agents who have rare, many, or high-level skills, who receive a disproportionate share of the calls for handling. As a consequence, these agents are subject to high stress and overwork, resulting in "burnout".

SUMMARY OF THE INVENTION

This invention is directed to solving these and other problems and disadvantages of the prior art. Generally according to the invention, a call-distribution arrangement improves the equity of distribution of calls to agents by basing the distribution on the agents' individual occupancies. An agent's occupancy is typically defined as the ratio of the agent's work time (in all of the agent's skills, if skills-based call distribution is used) to the total time that the agent has been at work (the agent's staff time). Work time includes talk time (time spent on the phone with customers) and optionally also after-call work (ACW) time. The individual occupancies of the agents are determined, and the calls are distributed to the agents in inverse order of their individual occupancies. Illustratively, determining occupancies involves either determining how many calls each of the agents has handled within a predetermined time interval, or determining how much time of a predetermined time interval each of the agents has spent on handling of calls. An agent's occupancy is preferably determined either periodically, or whenever a call becomes available for allocation to the agent, or whenever the agent becomes available to take a call. The next call is then allocated (assigned) to an agent based on their individual occupancies: for example, the call is allocated either to the presently least-occupied one of the available agents or to an available agent whose occupancy will most benefit therefrom, such as an agent to whom allocation of the call will maximize convergence of actual and target occupancies. Illustratively, the agents are enqueued in a queue of agents waiting to handle calls in the inverse order of the agents' individual occupancies, and the calls are distributed to the agents in the order in which they are enqueued. Also illustratively, the agents are grouped (in virtual queues) and ordered according to their levels of expertise in a skill, and each group is ordered in the inverse order of the individual occupancies of the agents in that group.

According to the invention as claimed, there is provided a method whose steps implement the above-characterized procedure, and an apparatus that effects the method steps. The apparatus preferably includes an effector—any entity that effects the corresponding step—for each method step. Further according to the invention, there is provided a computer-readable medium containing software which, when executed in a computer, causes the computer to perform the method steps.

The invention takes positive action to correct an imbalance in the occupancies of the agents. For example, when an agent becomes available to handle a call, he or she is no longer automatically added to the tail end of the agent queue to await taking another call. Rather, when a call becomes available, it is given to an available agent with the lowest occupancy either relative to the occupancies of other agents or relative to the agent's own target occupancy. As an advantageous consequence thereof, the occupancies of the agents tend to converge over time either with each other or with their target occupancies, as desired.

The occupancies of agents typically do not remain stagnant, but rather change over time. Therefore, the occupancies of agents are occasionally re-determined, and the ordering of the agents waiting for calls is thus kept up-to-date with their present occupancies. For example, the enqueued agents are re-enqueued in the agent queue in the inverse order of their (new, present) individual occupancies.

These and other advantages and features of the present invention will become more apparent from the following description of an illustrative embodiment of the invention taken together with the drawing.

DETAILED DESCRIPTION

Figure 1:
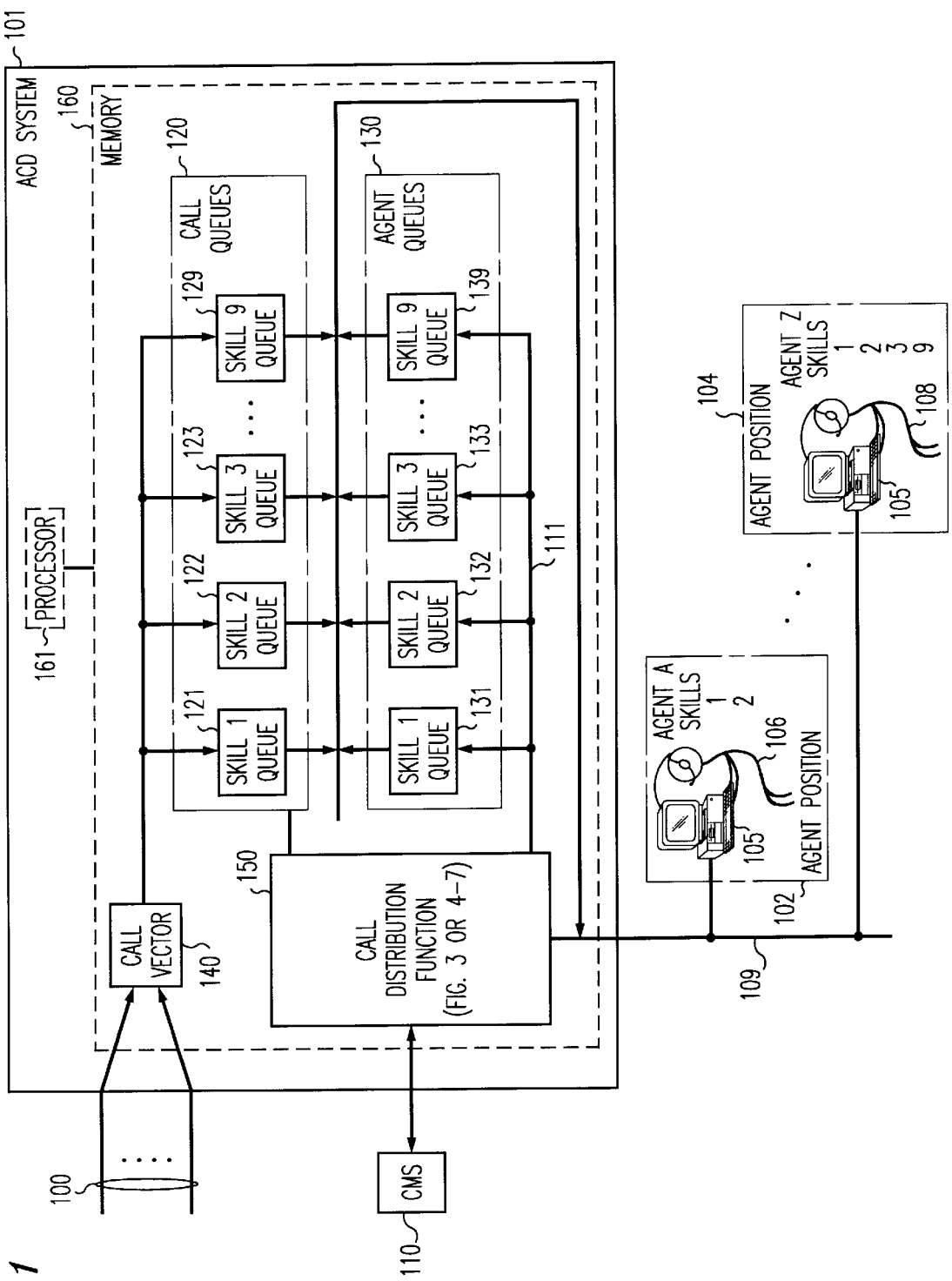
FIG. 1 is a block diagram of a call center that includes an illustrative embodiment of the invention.

FIG. 1 shows an illustrative call center. As is conventional, the call center comprises a plurality of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. Terminals 105 are connected to ACD system 101 by a voice-and-data transmission medium 109. Also connected to ACD system 101 is a conventional call management system (CMS) 110 that gathers call records and call-center statistics for use in managing the call center and in generating call-center reports.

ACD system 101 is illustratively the Lucent Technologies Definity® Enterprise Communications System (ECS)-based ACD system. It is a stored-program controlled system that conventionally includes interfaces to external communications links, a communications switching fabric, service circuits (e.g., tone generators, announcement circuits, etc.), memory 160 for storing control programs and data, and a processor 161 for executing the stored control programs to control the interfaces and the fabric and to provide automatic call-distribution functionality. Included among the data stored in the memory 160 of ACD system 101 are a set of call queues 120 and a set of agent queues 130. Each call queue 121–129 corresponds to a different agent skill, as does each agent queue 131–139. Conventionally, calls are prioritized, and either are enqueued in individual ones of call queues in their order of priority or are enqueued in different ones of a plurality of call queues that correspond to a skill and each one of which corresponds to a different priority. Included among the control programs in ACD system 101 is a call vector 140 which assigns calls incoming on lines or trunks 100 to different call queues 121–129 based upon the agent skills that they require for their proper handling. A call may be handled by more than one skill, and hence may be assigned to multiple call queues 121–129 simultaneously, most likely at different priorities. Agents 106–108 who are available for handling calls are assigned to agent queues 131–139 based upon the skills which they possess. An agent may have multiple skills, and hence may be assigned to multiple agent queues 131–139 simultaneously. Furthermore, an agent may have different levels of skill expertise and hence may be assigned to different agent queues 131–139 at different expertise levels. The control programs stored in the memory 160 of ACD system 101 further include a call-distribution function 150 that matches incoming calls with available agents and causes ACD system 101 to route each call for handling to the agent selected by function 150 from the head of an agent queue 131–139.

Figure 2:
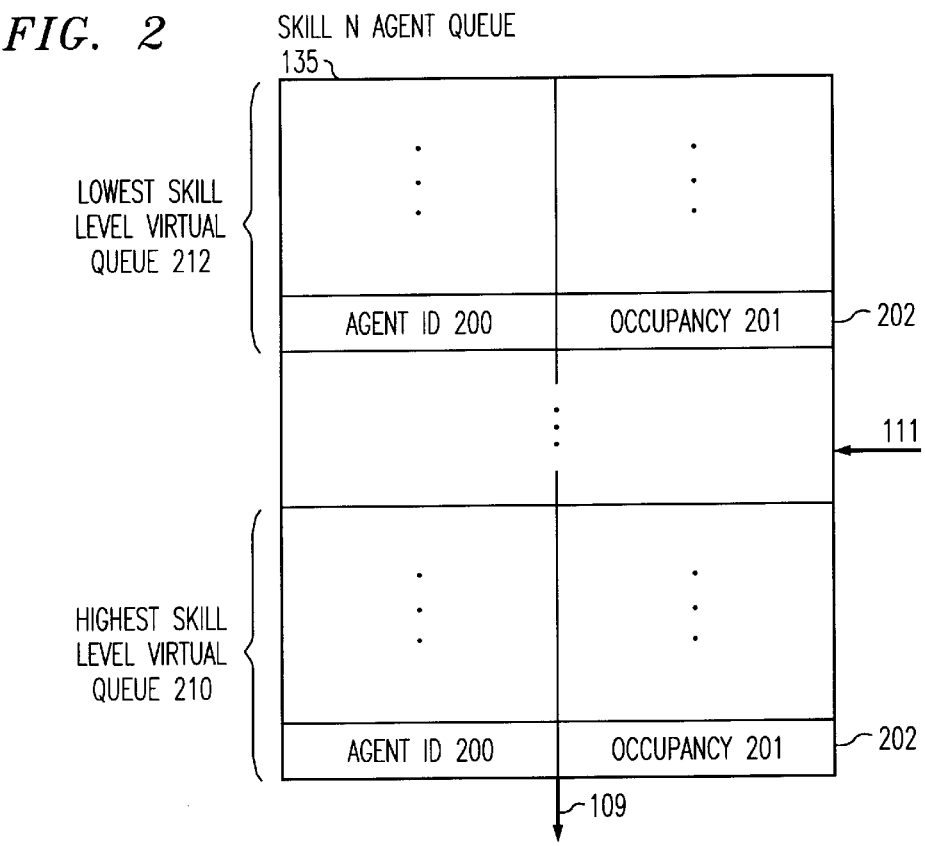
FIG. 2 is a block diagram of an agent queue of the call center of FIG. 1.

FIG. 2 shows the structure of a skill-N agent queue 135, which is representative of all agent queues 131–139. Agent queue 135 comprises a sequence of one or more groups—virtual queues 210–212—each corresponding to a different skill-expertise level. Best results are likely to be obtained by using an agent queue that has only one virtual queue, i.e., one that ignores levels of expertise; however, for ease of understanding, the more complex case of a plurality of virtual queues is illustrated. The sequence is ordered according to skill-expertise level: the highest-expertise-level virtual queue 210 is at the head of agent queue 135, and the lowest-expertise level virtual queue 212 is at the tail of agent queue 135. Each virtual queue 210–212 comprises a group of entries 202. Each entry 202 comprises an agent ID field 200 and an occupancy level field 201. Field 200 of an entry 202 identifies an idle agent 106–108 having the corresponding skill and skill-expertise level, and field 201 of that entry 202 indicates the identified idle agent's present occupancy. Each virtual queue 210–212 is ordered inversely according to occupancies of the enqueued agents 106–108: entries 202 of agents having the lowest occupancy are at the head of each virtual queue 210–212, and entries 202 of agents having the highest occupancy are at the tail of each virtual queue 210–212.

Figure 3:
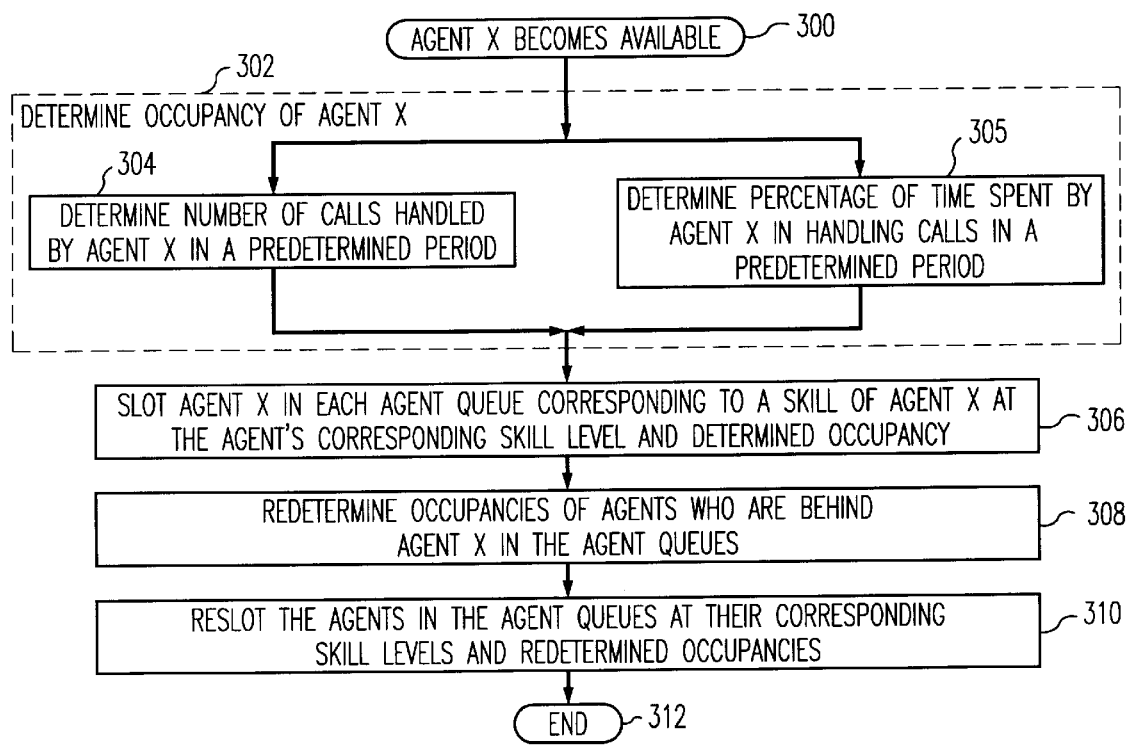
FIG. 3 is a flow diagram of operations of a first illustrative call-distribution function of the call center of FIG. 1.

FIG. 3 shows that part of an illustrative example of the operation of call-distribution function 150 that is relevant hereto. When an agent 106–108 becomes available and no call is waiting for that agent's expertise, at step 300, call-distribution function 150 determines the present occupancy of that available agent, at step 302, from data gathered by ACD system 101 and possibly also CMS 110. The formula used to compute the occupancy is a function of the demands of equity: if equity demands that all agents handle the same number of calls, call-distribution function 150 determines the number of calls that have been handled by the idle agent in a predetermined time period, e.g., within the last hour, or since the agent last logged in, at step 304; but if equity demands that all agents spend the same amount of time handling calls, call-distribution function 150 determines the percentage of time that has been spent by the idle agent on handling calls in a predetermined time period, e.g., within the last hour, or since the agent last logged in, at step 305.

Following determination of the idle agent's occupancy at step 302, call-distribution function 150 slots the idle agent at the determined occupancy into a virtual queue 210–212 that corresponds to the agent's skill-expertise level in each agent queue 131–139 that corresponds to one of the agent's skills, at step 306. Call-distribution function 150 does so by comparing the agent's determined occupancy with contents of occupancy fields 201 in the subject virtual queues. When it finds an entry 202 with a higher occupancy in field 201 than that of the subject agent, it frees that entry 202 by pushing all subsequent entry contents up one entry 202 (toward the tail) in the virtual queue, and enters the subject agent's data in the freed entry 202. If it does not find any entries 202 with a higher occupancy, call-distribution function 150 merely enters the subject agent's data in a free entry 202 at the tail of the virtual queue. Agents are usually then removed from the head of the queue to handle calls, as is conventional.

If the occupancies of agents did not change over time, that is all that would be required of call-distribution function 150. However, occupancies of agents do change over time, and therefore the occupancies of agents who are enqueued in agent queues 131–139 may not be up-to-date at this point. Preferably, call-distribution function 150 therefore re-determines the occupancies of any agents whose entries 202 are behind (above) the entry 202 of the subject agent in each virtual queue 210–212 in which the subject agent has an entry 202, at step 308. Call-distribution function 150 then re-slots each of the agents whose occupancy was re-determined, in the same manner as it had slotted the subject agent at step 306, at step 310. Call-distribution function 150 then ends its agent-slotting operations, at step 312. As a consequence of the described operation of call-distribution function 150, the occupancies of all agents tend to converge over time.

Alternatively, instead of re-determining at step 308 the occupancies of agents who are behind the subject agent in the agent queues, call-distribution function 150 may re-determine the occupancies of a predetermined number of agents who are last in (i.e., at the end of) each virtual queue in which the subject agent has an entry. Also alternatively, instead of re-determining the occupancies at step 308 after each performance of step 306, call-distribution function 150 may perform the re-determinations periodically, i.e., at each expiration of a predetermined time interval.

Figure 4:
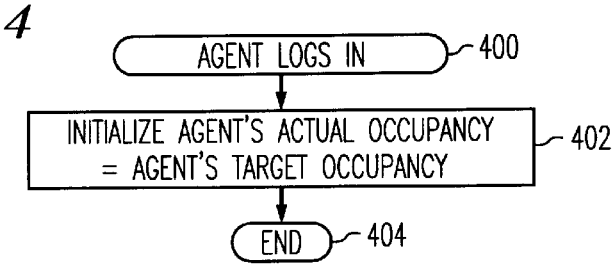
FIGS. 4–6 are flow diagrams of operations of a second illustrative call-distribution function of the call center of FIG. 1.
Figure 5:
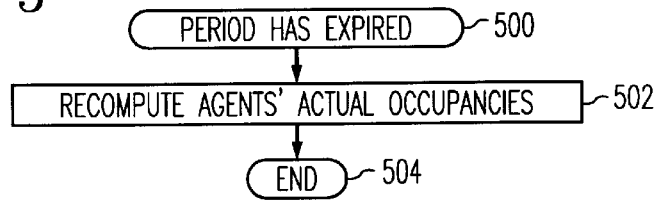
Figure 6:
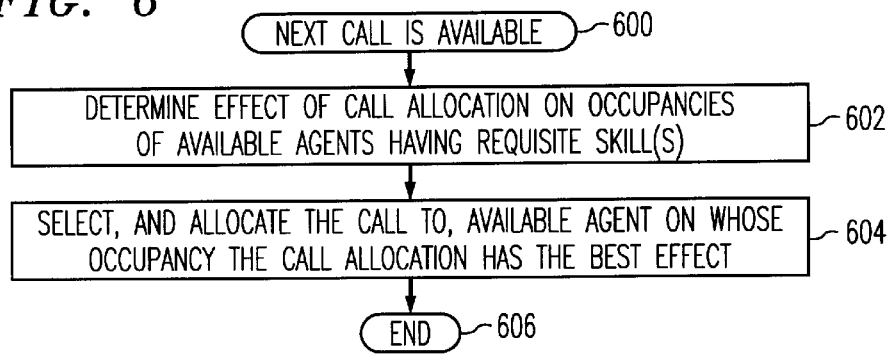
Figure 7:
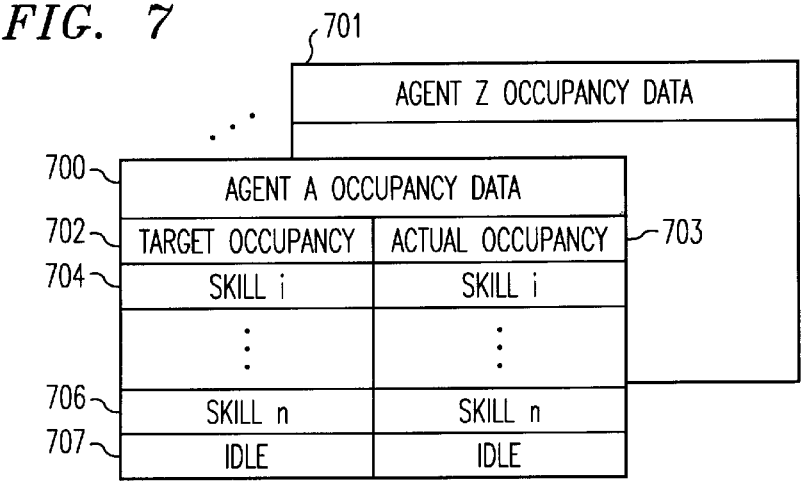
FIG. 7 is a block diagram of data structures used by the operations of FIGS. 4–6.

FIGS. 4–6 show that part of another illustrative example of the operation of call-distribution function 150 that is relevant hereto. This operation typically makes use of the data structures shown in FIG. 7. A different one of data structures 700–701 is associated with each agent A–Z, respectively. Each data structure 700–701 includes two sets of occupancy data: target occupancy data 702 which is pre-administered to indicate the agent's desired occupancy, and actual occupancy data 703 that indicates the agent's actual occupancy. Each data structure 700–701 includes zero or more entries 704–706 each one of which indicates the target and actual occupancies for a different one of the agent's skills, and entry 707 which indicates the agent's target and actual idle time (i.e., idle occupancy, or non-occupancy). If the operation of function 150 is to merely implement a mostidle-agent (MIA) call-allocation algorithm, whereby a call is allocated to the agent who has either the maximum actual idle time or maximum deviation between actual idle time and target idle time, then entries 704–706 of data structures 700–701 are not needed.

Turning to FIG. 4, call-distribution function 150 is invoked when an agent logs in, at step 400. It initializes actual occupancy data 703 for that agent to the values of target occupancy data 702 for that agent, at step 402, and then ends, at step 404. (Alternatively, actual occupancy data 703 may initially be left undefined, i.e., valueless.) Thereafter, function 150 is periodically re-invoked, at step 500 of FIG. 5, and it re-computes the agent's actual occupancy data 703 to reflect the agent's actual experience either since log-in at step 400 or during some other time interval, at step 502. Its execution then ends, at step 504. Re-invocation of function 150 at step 500 is performed either simultaneously for all logged-in agents at the expiration of each period that is timed commonly for all of the agents, or individually for each logged-in agent at the expiration of each period that is timed separately for each agent.

Allocation of calls to logged-in agents is performed by function 150 in the manner shown in FIG. 6. When a (next) call becomes available for handling, at step 600, function 150 considers the occupancy data in data structures 700–701 of all logged-in agents who have the skills that are needed to handle that call and who are presently idle and hence available to handle the call, and determines the effect of the call allocation on the occupancy of individual ones of those agents, at step 602. Function then allocates the call to the agent on whose occupancy the call has the best effect, at step 604, and ends, at step 606. (Of course, if only one suitable agent is presently available to handle the call, the call may be allocated to that agent immediately and the other considerations of steps 602–604 may be dispensed with.)

The determinations and selection made at steps 602–604 may take on various forms involving various levels of complexity. The simplest is to allocate the call to the least-occupied available suitable agent (LOA)—the one who has the largest percentage of staff time spent as actual idle time. It is also simple to allocate the call to the one of the available suitable agents whose actual idle time is more than and deviates the most from his or her target idle time; or if there is no such agent, to the one whose actual idle time is less than and deviates the least from his or her target idle time. A more complex strategy is to allocate the call to the least-occupied one of the available suitable agents whose actual occupancy for the requisite call-handling skill or skills is below target. An even-more complex strategy is to take either all or some number or percentage of the least-occupied available suitable agents and from those agents determine and choose the one to whom allocation of the call will maximize convergence of the actual occupancies and the target occupancies (e.g., a strategy that minimizes the sum of the squares of deviancies of actual and target occupancies).

Of course, various changes and modifications to the illustrative embodiment described above will be apparent to those skilled in the art. For example, the call distribution function may be implemented by an adjunct processor to the ACD system, such as a PC, or through third-party call control using computer-telephony integration. Such changes and modifications can be made without departing from the spirit and the scope of the invention and without diminishing its attendant advantages. It is therefore intended that such changes and modifications be covered by the following claims.

The invention claimed is:

1. A method of distributing calls to a plurality of agents, comprising the steps of:

determining individual occupancies of the agents wherein the occupancy of an agent comprises a ratio of one of (a) time worked by the agent and (b) a number of calls handled by the agent, over a staff time of the agent; and distributing the calls to the agents in inverse order of their individual occupancies.

2. The method of claim 1 wherein:

the step of determining comprises the step of determining which one of the agents is least occupied; and the step of distributing comprises the step of assigning a next one of the calls to the least occupied agent.

3. The method of claim 1 wherein:

the step of determining comprises the step of determining which agent's actual idle time most exceeds that agent's target idle time; and the step of distributing comprises the step of assigning a next one of the calls to the determined one agent.

4. The method of claim 1 wherein:

the step of determining comprises the step of periodically determining individual occupancies of the agents; and the step of distributing comprises the steps of distributing the calls to the agents in inverse order of their present said individual occupancies.

5. The method of claim 1 wherein:

the step of determining comprises the step of determining which agent's individual occupancy would most benefit from a call being assigned to that agent; and the step of distributing comprises assigning a next one of the calls to the determined agent.

6. The method of claim 1 for distributing the calls each one of which needs at least one of a plurality skills to the plurality of agents each one of which has at least one of the plurality of skills, wherein:

the step of determining comprises the step of determining individual occupancies of individual said agents in individual ones of the plurality of skills; and the step of distributing comprises the steps of determining which of the plurality of skills is needed by a next one of the calls, determining, from the individual occupancies in the individual skills of the individual agents and from the skills needed by the next call, which individual agent's occupancies would most benefit from the next call being assigned to that individual agent, and assigning the call to the determined individual agent.

7. The method of claim 1 wherein:

the step of determining comprises the step of determining how many calls each of the agents had handled within a predetermined time interval.

8. The method of claim 1 wherein:

the step of determining comprises the step of determining how much time of a predetermined time interval each of the agents has spent on handling of calls.

9. The method of claim 1 wherein:

the step of determining comprises the step of determining each agent's occupancy when the agent becomes available to handle a call.

10. The method of claim 1 further comprising the step of:

occasionally re-determining the individual occupancies of at least some of the agents.

11. The method of claim 1 wherein:

the step of distributing comprises the steps of enqueuing the agents in a queue of agents waiting to handle calls in the inverse order of the agents' individual occupancies; and distributing the calls to the agents in the order in which they are enqueued.

12. The method of claim 11 further comprising the step of:

occasionally re-determining the individual occupancies of at least some of the enqueued agents; and re-enqueuing the enqueued agents in the queue in the inverse order of their individual occupancies.

13. The method of claim 1 wherein:

the step of distributing comprises the steps of ordering the plurality of agents into groups according to their individual levels of expertise in a skill;

ordering the agents in each group in the inverse order of their individual occupancies; and distributing the calls to the plurality of agents in the order in which they are ordered.

14. The method of claim 1 wherein:

the step of determining comprises the steps of determining each agent's individual occupancy when the agent becomes available to handle a call, and enqueuing the agent according to the agent's occupancy in a queue of agents waiting to handle calls and ordered in an inverse order of the agents' individual occupancies; and the step of distributing comprises the steps of dequeuing the agents in the order in which they are enqueued, and distributing the calls to the dequeued agents in the order in which they are dequeued.

15. The method of claim 14 wherein:

the step of enqueuing comprises the step of enqueuing the agent having a level of expertise in a skill according to the agent's occupancy in an agent queue that corresponds to the agent's level of expertise in a plurality of agent queues each corresponding to a different level of expertise in the skill, each of the agent queues being ordered in an inverse order of the agents' individual occupancies; and the step of dequeuing comprises the step of dequeuing the agents from the plurality of queues in an order of the queues' corresponding levels of expertise in the skill and from each one of the queues in the order in which the agents are enqueued in said one queue.

16. An apparatus for distributing calls to a plurality of agents, comprising:

an effector of determining individual occupancies of the agents wherein the occupancy of an agent comprises a ratio of one of (a) time worked by the agent and (b) a number of calls handled by the agent, over a staff time of the agent; and an effector, cooperative with the effector of determining, of distributing the calls to the agents in inverse order of their individual occupancies.

17. The apparatus of claim 16 wherein:

the effector of determining comprises an effector of determining which one of the agents is least occupied; and the effector of distributing comprises an effector of assigning a next one of the calls to the least occupied agent.

18. The apparatus of claim 16 wherein:

the effector of determining comprises an effector of determining which agent's actual idle time most exceeds that agent's target idle time; and the effector of distributing comprises an effector of assigning a next one of the calls to the determined one agent.

19. The apparatus of claim 16 wherein:

the effector of determining comprises an effector of periodically determining individual occupancies of the agents; and the effector of distributing comprises means for distributing the calls to the agents in inverse order of their present said individual occupancies.

20. The apparatus of claim 16 wherein:

the effector of determining comprises an effector of determining which agent's individual occupancy would most benefit from a call being assigned to that agent; and the effector of distributing comprises an effector of assigning a next one of the calls to the determined agent.

21. The apparatus of claim 16 for distributing the calls each one of which needs at least one of a plurality of skills to the plurality of agents each one of which has at least one of the plurality of skills, wherein;

the effector of determining comprises an effector of determining individual occupancies of individual said agents in individual ones of the plurality of skills; and the effector of distributing comprises an effector of determining which of the plurality of skills is needed by a next one of the calls, an effector of determining, from the individual occupancies in the individual skills of the individual agents and from the skills needed by the next call, which individual agent's occupancies would most benefit from the next call being assigned to that individual agent, and an effector of assigning the call to the determined individual agent.

22. The apparatus of claim 16 wherein:

the effector of determining comprises an effector of determining how many calls each of the agents has handled within a predetermined time interval.

23. The apparatus of claim 16 wherein:

the effector of determining comprises an effector of determining how much time of a predetermined time interval each of the agents has spent on handling of calls.

24. The apparatus of claim 16 wherein:

the effector of determining determines each agent's occupancy when the agent becomes available to handle a call.

25. The apparatus of claim 16 wherein:

the effector of determining occasionally re-determines the individual occupancies of at least some of the agents.

26. The apparatus of claim 16 wherein:

the effector of distributing comprises storage defining a queue of agents waiting to handle calls, an effector of enqueuing the agents in the queue in the inverse order of the agents' individual occupancies, and an effector of distributing the calls to the agents in the order in which they are enqueued.

27. The apparatus of claim 26 wherein:

the effector of determining occasionally re-determines the individual occupancies of at least some of the enqueued agents; and the effector of enqueuing responds to the re-determining by re-enqueuing the enqueued agents in the queue in the inverse order of their individual occupancies.

28. The apparatus of claim 16 wherein:

the effector of distributing comprises an effector of ordering the plurality of agents into groups according to their individual levels of expertise in a skill, an effector of ordering the agents in each group in the inverse order of their individual occupancies, and an effector of distributing the calls to the plurality of agents in the order in which they are ordered.

29. The apparatus of claim 16 wherein:

the effector of distributing comprises storage defining a queue of agents waiting to handle calls and ordered in an inverse order of the agents' individual occupancies, and an effector of dequeuing the agents in the order in which they are enqueued and distributing the calls to the dequeued agents in the order in which they were dequeued; and the effector of determining comprises an effector of determining each agent's individual occupancy when the agent becomes available to handle a call, and an effector of enqueuing the agent according to the agent's occupancy in the queue.

30. The apparatus of claim 29 wherein:

the effector of enqueuing comprises storage defining a plurality of agent queues each corresponding to a different level of expertise in a skill, each of the agent queues being ordered in an inverse order of the agents' individual occupancies, and an effector of enqueuing the agent having a level of expertise in a skill according to the agent's occupancy in an agent queue of the plurality of agent queues that corresponds to the agent's level of expertise in the skill; and the effector of dequeuing comprises an effector of dequeuing the agents from the plurality of queues in an order of the queues' corresponding levels of expertise in the skill and from each one of the queues in the order in which the agents are enqueued in said one queue.

31. An apparatus for performing the steps of claim 1 or 2 or 3 or 4 or 5 or 6 or 7 or 8 or 9 or 10 or 11 or 12 or 13 or 14 or 15.

32. A computer-usable program storage device having embodied therein means for effecting distribution of calls to a plurality of agents, said means being computer-readable program code means for causing the computer to perform the functions of:

causing individual occupancies of the agents to be determined as ratios of one of (a) time worked by each agent and (b) a number of calls handled by each agent, over a staff time of each agent; and causing the calls to be distributed to the agents in inverse order of their individual occupancies.

\* \* \* \* \*